us008151328B1

(12) United States Patent
Lundy et al.

(10) Patent No.: US 8,151,328 B1
(45) Date of Patent: Apr. 3, 2012

(54) ACCESSING SECURE NETWORK AREAS BY UTILIZING MOBILE-DEVICE AUTHENTICATION

(75) Inventors: Michael T. Lundy, Olathe, KS (US); Jason K. Whitney, Lee's Summit, MO (US)

(73) Assignee: Sprint Communications Company L.P., Overland Park, KS (US)

(*) Notice: Subject to any disclaimer, the term of this patent is extended or adjusted under 35 U.S.C. 154(b) by 916 days.

(21) Appl. No.: 11/781,040

(22) Filed: Jul. 20, 2007

(51) Int. Cl.
 G06F 17/04 (2006.01)
 G06F 15/16 (2006.01)
 G06F 17/30 (2006.01)
 H04L 29/06 (2006.01)
(52) U.S. Cl. .......................................................... 726/5
(58) Field of Classification Search ....................... 726/5
 See application file for complete search history.

(56) References Cited

U.S. PATENT DOCUMENTS

| 6,615,253 | B1 * | 9/2003 | Bowman-Amuah | .......... 709/219 |
| 7,552,467 | B2 | 6/2009 | Lindsay | |
| 2006/0224901 | A1 | 10/2006 | Lowe | |
| 2007/0037566 | A1 | 2/2007 | D'Agostino et al. | |
| 2009/0158032 | A1 * | 6/2009 | Costa et al. | .................... 713/156 |

FOREIGN PATENT DOCUMENTS

WO  2007123554  11/2007

OTHER PUBLICATIONS

"Kyungwhan Park; Gun Il Ma, Jeong Hyun Yi; Youngseob Cho; Sangrae Cho, Sungeun Park;""SmarLphone remote lock and wipe system with integrity checking of SMS notification"""; Consumer Electronics (ICCE), 2011 IEEE Inernational Conference on Digital Object Identifies; Publication Year Jul. 2011, pp. 263-264".*
Office Action in U.S. Appl. No. 11/851,949 mailed Oct. 5, 2010.
Office Action mailed Mar. 11, 2011 in U.S. Appl. No. 11/851,949.
Notice of Allowance mailed Jun. 9, 2011 in U.S. Appl. No. 11/851,949.
"Kyungwhan Park; Gun Il Ma, Jeong Hyun Yi; Youngseob Cho; Sangrae Cho, Sungeun Park;""Smartphone remote lock and wipe system with integrity checking of SMS notification"""; Consumer Electronics (ICCE), 2011 IEEE Inernational Conference on Digital Object Identifies; Publication Year Jul. 2011, pp. 263-264".

* cited by examiner

Primary Examiner — Kambiz Zand
Assistant Examiner — Stephen Sanders

(57) ABSTRACT

One or more media is provided for granting a user access to a secured portion of a website. Initially, a request to access is received from a user, where the request is typically composed of access information (e.g., user ID, password). Incident to receiving the request for access, a subscriber server initiates a request to validate a set of security credentials. One security credential may be a device identifier sent to a communications network in response to a user being conveyed a dial-in number. This device identifier may be extracted from a communication transmitted from the mobile device and validated by leveraging the communications network authentication procedure. Authentication is utilized to verify the identity of the user. Additional security credentials may also require satisfaction before granting a requesting user access. For instance, satisfaction may include comparing access information within a user request against the set of security credentials.

19 Claims, 8 Drawing Sheets

ACCESSING SECURE NETWORK AREAS BY UTILIZING MOBILE-DEVICE AUTHENTICATION

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Some embodiments provide computer-readable media for, among other things, verifying the identity of a user by authenticating the user's mobile device, or by leveraging the technologies associated with authenticating the mobile device to satisfy security requirements associated with accessing a secured website or portion thereof. Embodiments have several practical applications in the technical arts, including utilizing a device identifier provisioned in a mobile device to identify the user incident to the mobile device sending a transmission to a communications network. Accordingly, the mobile device may be used as a "key" for gaining entry to the secured portion of the website or as method for satisfying an additional layer of security that protects information that is restricted from general public access.

Embodiments generally relate to providing a user access to a secured portion of a website by authenticating a mobile device. More particularly, a first aspect of an embodiment includes a set of computer-useable instructions that provides for receiving a request to access a secured portion of a website. Access to the secured portion requires validation of a set of security credentials associated with the user. Validation of security credentials can include receiving from a communications network an indication that the user is authorized or not. In particular, upon the user initiating a request for access, a subscriber server will attempt to validate the set of security credentials by performing a procedure. The procedure includes attempting to satisfy a set of network-authentication procedures that are used by a communications network to authenticate the mobile device. Upon validating the set of security credentials, access may be granted to the secured portion of the website.

In a second aspect, embodiments are directed toward computer-readable media for providing access to digitally secured information by authenticating a mobile device. Initially, a request to access the digitally secured information is received. In one embodiment, the digitally secured information is information that requires validation of a set of security credentials associated with the user to access. Next, a request to validate the set of security credentials by performing a procedure is initiated from a subscriber of a communications network. In one embodiment, the procedure includes satisfying a set of network-authentication procedures, where the network-authentication procedures comprise authenticating a device identifier communicated from the mobile device associated with the user. Next access to the digitally secured information is granted upon the validation of the set of security credentials.

A further aspect of an embodiment takes the form of a set of computer-useable instructions embodied on computer-readable media for validating a security credential upon a communication from a user with a mobile device. Initially, a communication is received from a user device with a unique device identifier provisioned thereon. In one embodiment, the communication will have an indicia of the unique device identifier embedded therein. Then an authentication application residing on a communications-network server will perform a set of network-authentication procedures that authenticate the mobile device based on the indicia. Upon determining the mobile device is authentic, an indication of validity is provided from the communications-network server to a subscriber server. The subscriber server may grant the user access to a secured portion of a website upon receipt of the indication of validity.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
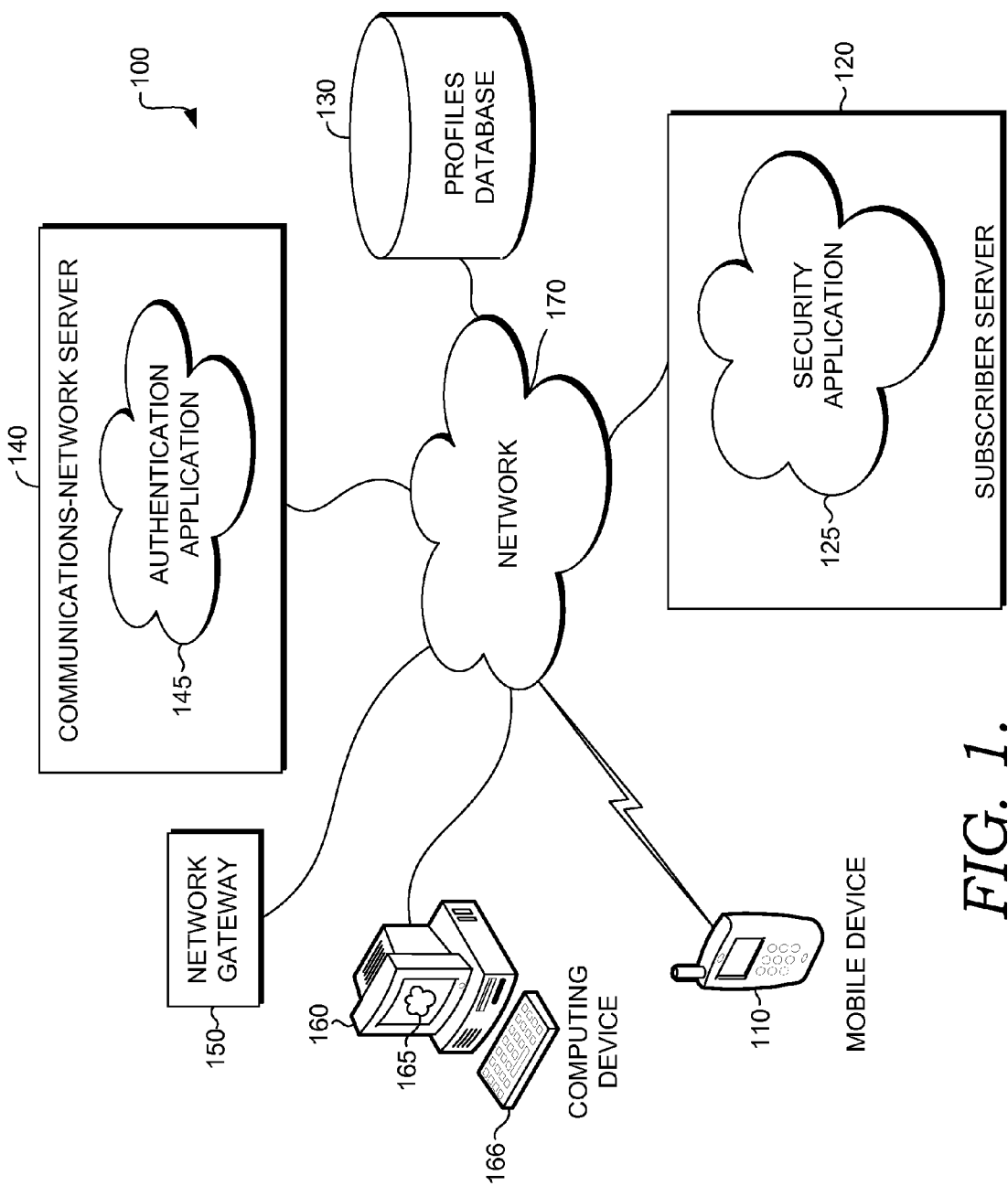
FIG. 1 is a block diagram of an exemplary system architecture suitable for use in implementing embodiments of the present invention.

Embodiments provide systems and methods for providing a user access to a secured portion of a website by authenticating a mobile device. Providing security on websites is useful to help safeguard the viewing and dissemination of confidential information (e.g., bank accounts, identification information, addresses) related to users of a server, where the server has a secured portion with restricted access. One measure of security is based upon the user providing security information, or user credentials, that are specific to a particular user. One form of security information is information associated with a user's mobile device that may be used similar to a key to grant a user in possession of the mobile device access to the secured portion of the website. By simply having the mobile device in proximity to the user while attempting to acquire access at the user interface, the server may authenticate the mobile device and utilize the authentication as user validation.

Acronyms and Shorthand Notations

Throughout the description, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ESN | Electronic Serial Number |
| LANs | Local Area Networks |
| MIN | Mobile Identification Number |
| MSID | Mobile Station Identification |
| PDA | Personal Digital Assistant |
| PIN | Personal Identification Number |
| WANs | Wide Area Networks |

Further, various technical terms are used throughout this description. A definition of such terms can be found in *Newtons Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate that embodiments may be embodied as, among other things, a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Methods and systems are provided for validating access information against a set of security credentials to verify the identity of a user in order to grant access to a "secured portion of a website" or other "digitally secured information." A secured portion of a website refers to information restricted from access by one or more security measures (i.e., layers of security). In an exemplary embodiment, a secured portion of a website resides on a subscriber server, where the subscriber server determines whether to grant a user access upon receiving a request for access. In another embodiment, the secured portion of the website includes any information related to a user, user accounts with the subscriber, or data that the user desires to be protected. By way of example, the secured portion of a website is a user's bank account information, as more fully discussed below with reference to FIGS. 7 and 8. Digitally secured information refers to any protected information (e.g., user accounts, addresses, or other data). In an exemplary embodiment, the digitally secured information resides on a subscriber server. By way of example, the digitally secured information is located on the secured portion of the website (that is, accessible via the website after some set of security measures have been satisfied). Although two examples are discussed above, other embodiments contemplate holding other types of digitally secured information on other computing devices that can store or transmit data.

Generally, some aspects of granting access to a user are directed toward determining the identity of a user by validating a set of security credentials upon receiving a user request to access the digitally secure information. Validating includes determining whether a "set of network-authentication procedures" are satisfied. The set of network-authentication procedures refer to steps taken by a communications network to authenticate a mobile device that transmits a communication (e.g., a voice call, IM, text message, etc.) to a communications network. In one embodiment, these procedures are satisfied by authenticating a mobile device incident to the user utilizing the mobile device to transmit a communication to a communications network. In another embodiment, the set of network-authentication procedures is satisfied by the user consuming a communication that is transmitted from the communications network to the user's mobile device.

In an exemplary embodiment, the set of network-authentication procedures include conveying to the user a "dial-in number." As discussed herein, dial-in numbers are phone numbers, or short codes, entered into a mobile device, and used in connection with helping to identify the calling party. In one instance, the dial-in number is provided by a communications-network server to a subscriber for presentation to the user at a user interface of a computing device. In another instance, the dial-in number is conveyed from the communications-network server to the user's mobile device. These instances are discussed with more particularity below. As an additional measure of security, a plurality of dial-in numbers may be established for a particular subscriber and provided thereto in a randomized manner at varying or fixed time intervals.

An illustrative network authentication procedure is determining the authenticity of a mobile device based, at least in part, upon a "device identifier." A device identifier refers to an indicator appended to, or embedded within, or communicated from, a mobile device that uniquely identifies the transmitting mobile device. In embodiments, the device identifier is an electronic serial number (ESN), a mobile station identification (MSID), or another mobile device attribute that is specific to the mobile device. In embodiments, a representation of the device identifier is sent instead of the actual credential so as to add another layer of security. Where we say "device identifier," we mean to refer to the device identifier or representation thereof, although we may not expressly say so in each circumstance.

A mobile identification number (MIN) or a caller identification (caller ID) number certainly may be used, but they are relatively easier to reproduce by an unauthorized user. In one embodiment, device identifiers are provisioned into the mobile device upon activation. In this instance, a communications-network server, a database, or a gateway on the network stores the device's identifying data (e.g., credentials) in association with other user information. Such other information may be useful for facilitating other processes, such as those in connection with billing. By way of example, the device identifier forms part of the security credentials that should be satisfied before granting access to a secured portion of the website.

"Security credentials" refer to data related to a user that can be used to identify that user and to verify the user's right to access certain digitally secured information. They are compared against known-valid access information in one embodiment. In another embodiment, the set of security credentials may include one or more of the following: a personal identification number (PIN), rotating password(s), user-login name, device identifiers of a mobile device, specific message (e.g., mother's maiden name), or any other data, which is normally predetermined data. In one embodiment, the set of security credentials is stored in association with user indicia (e.g., customer name, phone number, or other unsecured user identifiers) at a user profile. In one instance, the security credentials include user information provided by the user of the subscriber server. In another instance, the security credentials may be generated by the subscriber. In operation, the set of security credentials is validated prior to permitting a requesting user access to secured information.

Referring to the drawings in general, and initially to FIG. 1 in particular, a block diagram of an exemplary operating environment is shown and designated generally as computing system 100 configured to provide a user access to a secured portion of a website by authenticating a mobile device.

Illustrative computing system 100 includes, in one embodiment, a mobile device 110, a subscriber server 120, a profiles database 130, a communications-network server 140, a network gateway 150, and a computing device 160 all in communication with one another via a network 170 (which may actually be multiple networks). Although the various components of FIG. 1 are shown with lines for the sake of clarity, in reality, delineating various components is not so clear, and metaphorically, the lines would more accurately be grey or fuzzy.

Further, although some components of FIG. 1 are depicted as single blocks, the depictions are exemplary in nature and in number and are not to be construed as limiting (e.g., although only one mobile device 110 is show, many more may be operably coupled to network 170). Network 170 couples components 110, 120, 130, 140, 150, and 160 (wired, wirelessly, or a combination thereof).

Mobile device 110 is configured to transmit a communication, discussed more fully above, to network 170. In addition, mobile device 110 may be any type of device having communications capability. Mobile device 110 may be, or variously referred to as, a handheld device, mobile handset, consumer electronics device, cell phone, personal digital assistant (PDA) unit, and the like. In addition, each mobile device 110 is provisioned with a device identifier (which may be made up of multiple informational components) that uniquely identifies the device to network 170 in one embodiment. In one embodiment, the device identifier, as more fully discussed above, is embedded in or appended to each communication transmitted from the mobile device. In another embodiment, the device identifier is determined at the commencement or ending of a data-communication session (such as a phone call or messaging communication).

Each of subscriber server 120, profiles database 130, communications-network server 140, network gateway 150, and computing device 160 shown in FIG. 1 may take the form of various types of computing devices. By way of example only, components 120, 130, 140, 150, and 160 may be a personal computing device, handheld device, consumer electronic device, and the like. Additionally, computing device 160 is configured to present a user interface 165 and even to receive input at an input component 166 in one embodiment. User interface 165 may be presented on any presentation component (not shown) that may be capable of presenting information to a user. In an exemplary embodiment, user interface 165 presents a prompt for the user to provide an input (e.g., message, personal identifier, password, etc.) into an input-entry area.

Input component 166 allows a user to provide input to computing device 160. In an exemplary embodiment, the user may utilize input component 166 to provide access information (e.g., message, personal ID, password, etc.) to subscriber server 120.

Returning to FIG. 1, subscriber server 120 protects secure information of a user (e.g., customer) of a subscriber. Subscriber server 120 includes a security application 125 that is configured to grant access to such information upon validating a set of security credentials specific to the user. Validating is accomplished by performing a procedure. The procedure includes a variety of steps aimed at verifying the identity of the user requesting access. In one step, security application 125 establishes a user profile having a set of security credentials stored therein. As more fully discussed above, a user profile associates security credentials to user indicia. In another step, security application 125 receives a request to access the digitally secured information (e.g., at a secured portion of a website). In yet another step, security application 125 initiates a request to validate the set of security credentials, incident to receiving a request for access from a user. In still another step, access of the digitally secured information is granted. In one embodiment, access is granted if communications-network server 140 determines the device identifiers embedded in a mobile-device communication are authentic and the set of security credentials is satisfied by the received access information. Accordingly, the user is granted rights to view and/or manipulate information previously shielded by subscriber server 120. Alternatively, security application 125 may withhold from the user, rights to access at least a portion of the digitally secured information if any one of the set of security credentials is left unsatisfied, subscriber server 120. These steps of the procedure for validating the set of security credentials may be also be performed at any other component operably coupled to communications network 170.

The profiles database 130 stores information associated with a subscriber of the services of the communications network and is searchable for such information. In one embodiment, a subscriber profile is generated where information is associated with, or mapped to, a subscriber that utilizes communications network 170 to authenticate user mobile devices. In this embodiment, the associated information may include, for example, indicia of the subscriber, device identifiers associated with user mobile devices, dial-in numbers (discussed above), or any other data that relates to a subscriber or a customer thereof. Typically, the subscriber profile and information therein are accessible to the communications-network server 140; however, it is contemplated that any of the components 110, 120, 150, and 160 may have limited access to information residing within profiles database 130.

Communications-network server 140 is a computing device in the communications network that is configured to perform a variety of functions in one embodiment. One of these functions includes receiving a request from subscriber server 120 to establish a subscriber profile. Another of these functions includes providing a dial-in number to the subscriber server 120. Yet another of these functions includes utilizing network-authentication procedures to authenticate mobile device 110. One or more of these functions may be carried out by an authentication application 145.

Authentication application 145 resides, at least in part, on communications-network server 140 and may be particularly configured to authenticate mobile device 110 based on information provided by mobile device 110 and embedded within the transmission to the communications network. Typically, the information relied upon for authentication includes a device identifier provisioned on the mobile device. Illustrative examples of security credentials include an ESN, an MSID, and other identifying indicia, as more fully discussed above.

Network gateway 150 assists in authenticating the mobile device upon a user attempting to call the dial-in number. In one embodiment, network gateway 150 gleans mobile-device information (e.g., device identifier) from a call to the communications network. This embodiment is discussed more fully below with reference to FIG. 2.

Figure 2:
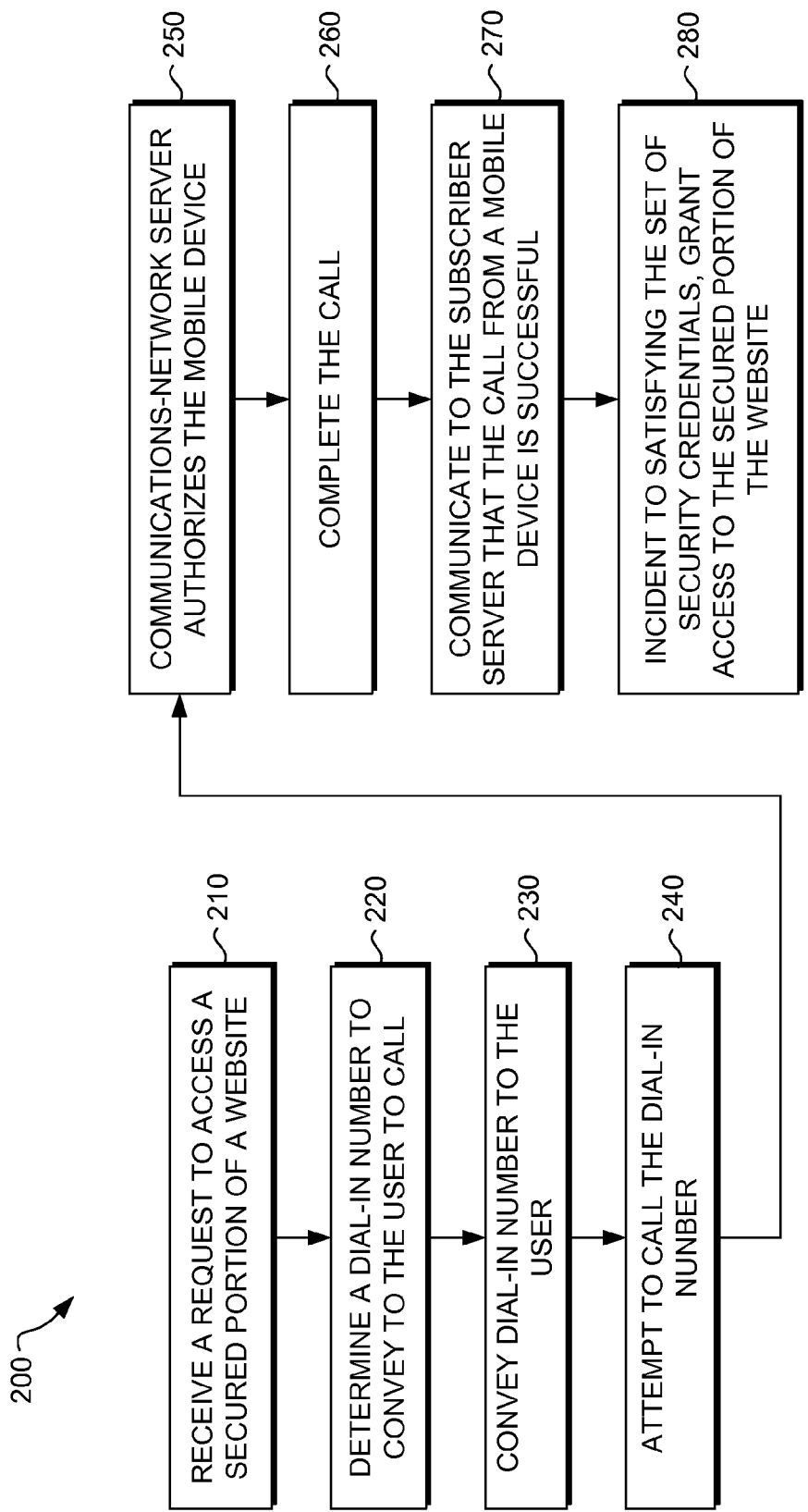
FIG. 2 is a flow diagram showing an overall method for verifying the identity of a user by authenticating a mobile device associated with that user, in accordance with an embodiment.

Turning now to FIG. 2, a flow diagram illustrates overall method 200 for identifying a user by authenticating a mobile device associated with that user, in accordance with an embodiment. Initially, as indicated at block 210, a request to access a secured portion of a website is received from a user. In one embodiment, access information (e.g., login name, password, security message), which is included in the request for access, is submitted by the user at computing device 160 and/or mobile device 110. Incident to receiving the request, the user profile may be searched for security credentials that correspond to the requesting user. The security credentials may then be compared against the access information received in the request according a procedure for validating the set of security credentials.

Then a determination of the dial-in number to convey to the user is performed, as indicated at block 220. In one embodiment, the dial-in number is determined by identifying a subscriber that is requesting the communications network to authenticate a requesting user's mobile device, and then locating an associated dial-in number at the subscriber profile. This step of determination is discussed more fully below with reference to FIG. 3

As indicated at block 230, incident to a user requesting access to a secured portion of the subscriber's website, the communications network conveys one or more dial-in numbers. that are presented on user interface 165. In one embodiment, conveying includes transmitting the dial-in number to a subscriber server. The subscriber server then forwards the dial-in number to a computing device or mobile device for presentation to the user. In another embodiment, conveying includes transmitting from the communications network to the mobile device of the requesting user. In yet another embodiment, more fully discussed below with reference to FIG. 6, no dial-in number is conveyed, but instead, a communication or message is sent to the user's mobile device upon the communications network identifying the requesting user.

The user, or calling party in possession of the user's mobile device, may attempt to make a call to the communications network, as indicated at block 240. In one embodiment, attempting to call includes entering the dial-in number into the user device. In another embodiment, attempting to call includes replying to a text-message or voice message conveyed from the communications network to the mobile device. In one instance of these embodiments, the attempt to call will fail if a prescribed amount of time has elapsed between conveying the dial-in number and receiving a communication from the mobile device utilizing the conveyed dial-in number.

As indicated at block 250, the communications network authorizes the mobile device by using a network-authentication procedure. An illustrative network-authentication procedure extracts the device identifier embedded within, or appended to, a communication from the user's mobile device. In one embodiment, the device identifier is received at the communications-network server, and/or at a network gateway. Next, a determination of the authenticity of a mobile device based, at least in part, upon the device identifier (e.g., ESN, MSID) is performed. In one embodiment, the determination of authenticity includes authenticating the device identifier against trustworthy information associated with a user registered on the communications network. For instance, profiles database is referenced to compare the received device identifier against stored subscriber and/or user information.

If the device identifiers and stored information sufficiently correspond, the network-authentication procedures are considered satisfied and the call is completed, as indicated at block 260. By completing the call, the communications network is affirming that the mobile device is truly the same device as held out by the user. As such, the technologies associated with authenticating the mobile device are leveraged to satisfy security requirements of the subscriber.

If the call is completed, as discussed above, a communication is relayed to the subscriber associated with the requesting user that the call from the requesting user's mobile device is successful. This is indicated at block 270. In one embodiment, an indication of validity is transmitted to subscriber server from the communications network. If, however, there are one or more inconsistencies upon authentication, the call is not completed and an indication of invalidity, or no indication of validity, is relayed to subscriber server.

Upon completing the call, access to the secured digital information may be granted, as indicated at block 280. If the step of determining whether the network-authentication procedures are satisfied utilizing components of the communications network is the only security credential that requires satisfaction, access is granted. But, if the subscriber server has established other security credentials that are to be validated (i.e., additional layers of security), access is granted upon satisfying each of the security credentials. Establishing the set of security credentials is discussed more fully in FIG. 5, while satisfying the set of security credentials is discussed more fully in FIG. 6.

Figure 3:
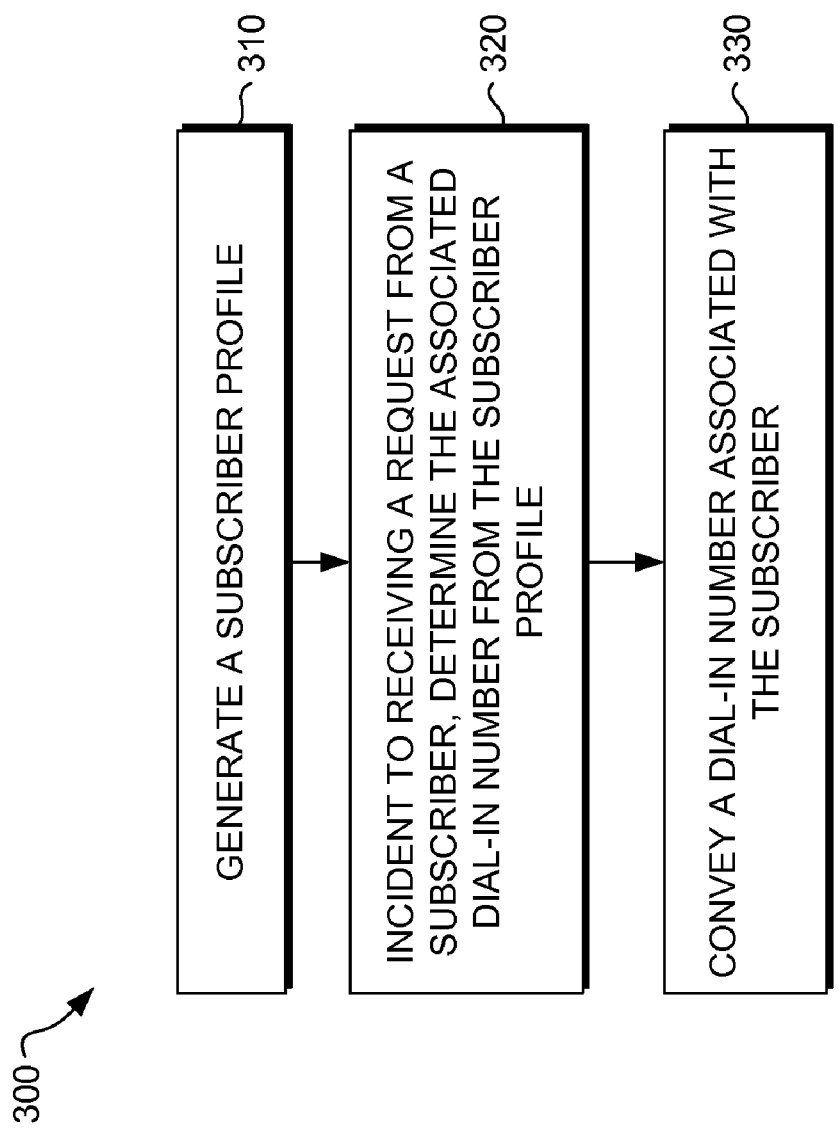
FIG. 3 is a flow diagram showing a method for determining a dial-in number to convey in response to a request for access, in accordance with an embodiment.

Turning now to FIG. 3, a flow diagram is illustrated that shows a method 300 for determining a dial-in number to convey in response to a request for access, in accordance with an embodiment. As indicated at block 310, a subscriber profile is created, which may be stored at the profiles database. In one embodiment, the user profile stores a dial-in number in association with a subscriber. Incident to receiving a request for access from a user, the subscriber initiates a request for authentication of the requesting user's mobile device. As indicated at block 320, incident to receiving the request from the subscriber, the communications network determines the dial-in number(s) associated with the subscriber at the subscriber profile. Then, as indicated at block 330, the associated dial-in number is conveyed to the subscriber, requesting user's mobile device, or both.

Figure 4:
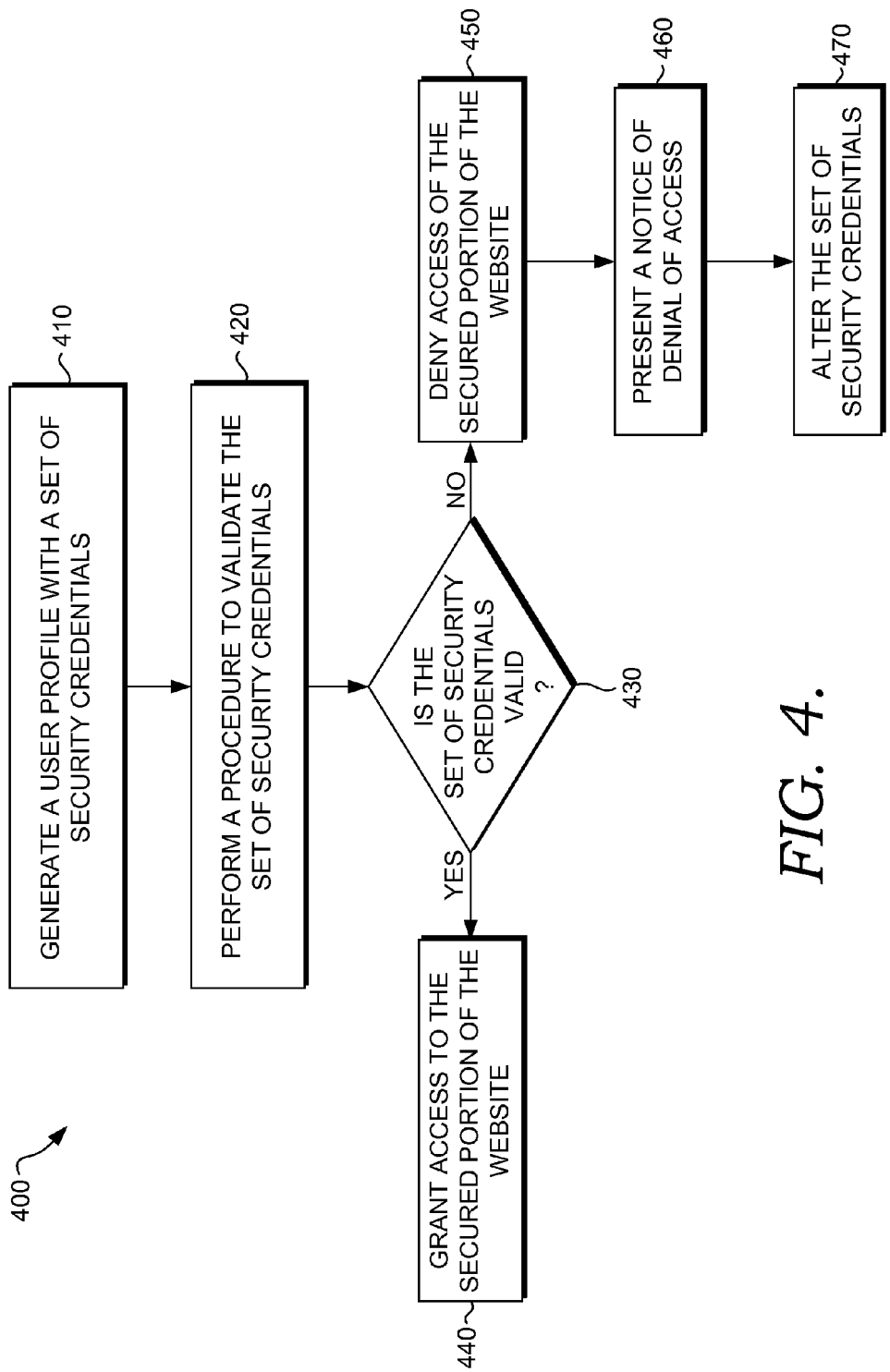
FIG. 4 is a flow diagram showing a method for verifying the identity of the user based on the set of security credentials, in accordance with an embodiment.

With reference to FIG. 4, a flow diagram is illustrated that shows a method 400 for verifying the identity of the user based on the set of security credentials, in accordance with an embodiment. As indicated at block, 410, a user profile with a set of security credentials is generated. Then a procedure is performed, incident to receiving a request to access, that validates the set of security credentials, as indicated at block 420. The procedure includes one or a combination of the following: comparing one or more of the set of security credentials against the received access information, satisfying a set of network-authentication procedures, or utilizing other mechanisms to verify the identity of the requesting user.

With more particularity, comparing includes receiving from a user access information and evaluating the access information against the security credentials. As indicated at block 430, if the set of security credentials is determined validated upon performing a validation procedure, then access is granted to the secured portion of the website (block 440). If, however, the set of security credentials is determined not validated by the user's request for access, access is denied to the secured portion of the website (block 450). As indicated at block 460, in the instance of denied access, a notice of denial of access is presented to the user at the user interface. Further, as indicated at block 470, the denied request triggers security functions that alter the set of security credentials to prevent further requests for access from the unauthorized user.

Figure 5:
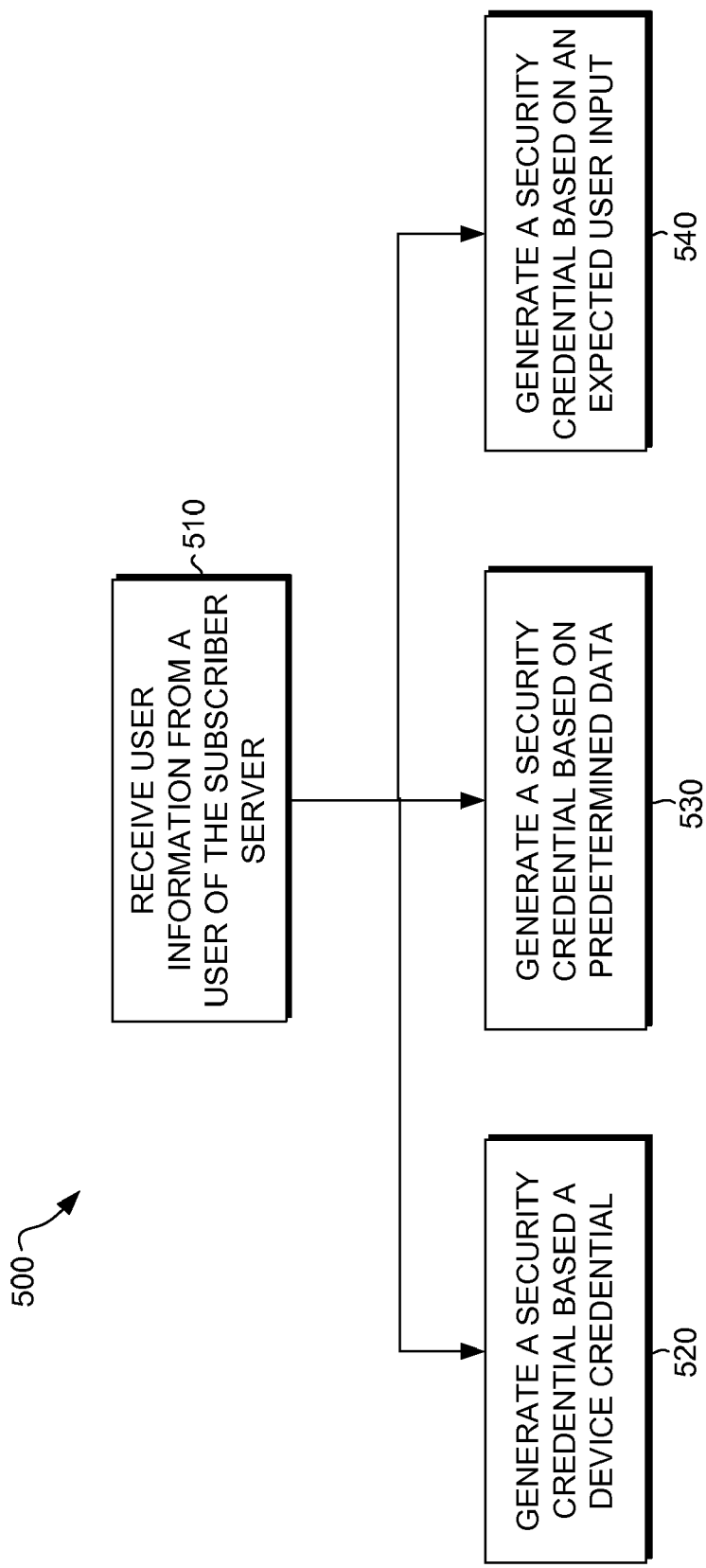
FIG. 5 is a flow diagram showing a method for establishing several of the set of security credentials, in accordance with an embodiment.

A flow diagram is illustrated in FIG. 5 that shows a method 500 for establishing several of the set of security credentials, in accordance with an embodiment. Initially, as indicated at block 510, user information is received from a user of a subscriber server. As indicated at blocks 520, 530, and 540, security credentials may be generated based on the user information. In particular, as indicated at block 520, a device identifier provisioned into the user's mobile device is registered with the communications network. As indicated at block 530, predetermined data is based on user information received from a user or data generated by the subscriber server. As indicated at block 540, an expected user input is utilized. In embodiments, the expected user input is a message entered at a user interface on the computing device or a response at a mobile device. This may be utilized to generate a set of security credentials along with other information. Some of the set of security credentials may be aggregated to establish a user profile that is accessible to the subscriber server, communications network, or both.

Figure 6:
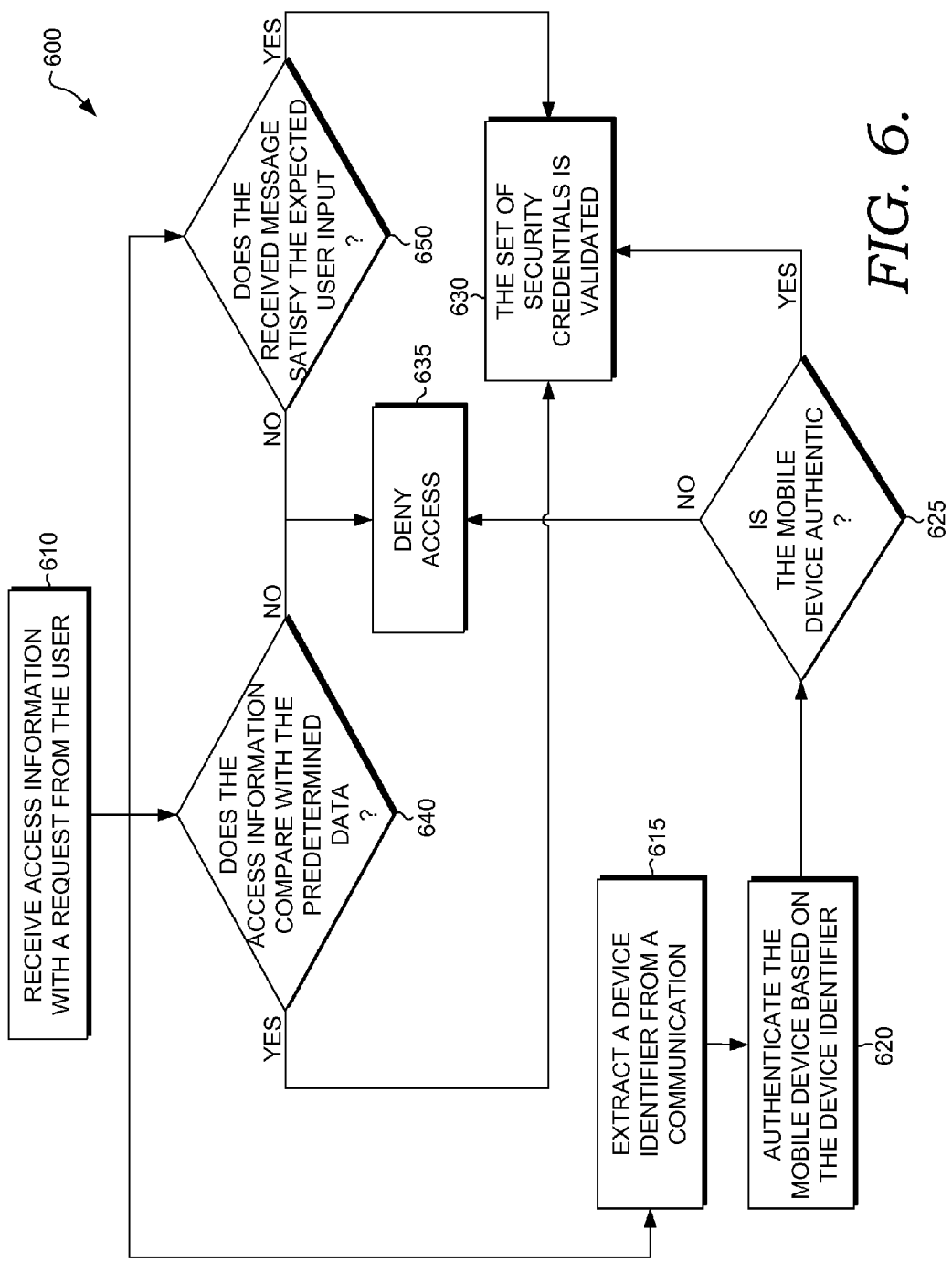
FIG. 6 is a flow diagram showing a method for validating security credentials against a device identifier received from a mobile device to access information received in a user request for access, in accordance with an embodiment.

Turning now to FIG. 6, a flow diagram is illustrated that shows a method 600 for validating security credentials against a device identifier received from a mobile device or against access information received in a user request for access, in accordance with an embodiment. As indicated at block 610, upon receiving information with a request for access, a process for determining whether the set of security credentials is satisfied is employed. In one embodiment, access is controlled and typically granted incident to receiving an indication that the user possesses a mobile device registered with the subscriber.

Determining whether the user possesses the mobile device is based upon satisfying a set of network-authentication procedures. These procedures include, as indicated at block 615, extracting a device identifier embedded within a communication transmitted from the mobile device. As discussed above, the communication may be initiated in a plurality of ways. In one embodiment, the communication is transmitted incident to the user entering and calling a dial-in number presented at a user interface, discussed below with reference to FIG. 7. In another embodiment, the communication is initiated upon the user selecting a link on a user interface that triggers the communications network to send a transmission (e.g., call, text, IM) to the mobile device. Upon the user of the mobile device consuming this transmission, a communication is provided to the communications network indicating that the user is in possession of the mobile device. This is discussed below with reference to FIG. 8.

Returning to FIG. 6, next, the mobile device may be identified as being registered to a particular user based on the communication, as indicated at block 620. If these, and other, network-authentication procedures are satisfied (block 625), the set of security credentials may be considered validated (block 630). Otherwise, the user is denied access to the digitally secured information, as indicated at block 635.

In some embodiments, additional security measures may be provided in conjunction with the network-authentication procedures to increase security and ensure that mere possession of a particular mobile device is not the single method for granting access. In this way, hacking into the secured site requires an unauthorized user to possess skills and tools to supersede more than one different security system, making a compromise of the security measures a highly unlikely event. In embodiments, the communications network and/or subscriber server may require access information uncommon to other individuals and the above-described mobile device authentication.

In one embodiment, as indicated at block 640, a determination of whether access information compares with a predetermined data security credential is performed. If, the access information corresponds with the predetermined data, then the set of security credentials is deemed validated (block 630). If inconsistent with the predetermined data, the invalid access information will cause the subscriber server to deny the user access (block 635).

In another embodiment, a transmission is sent from the communications network to the mobile device that includes a message. In one embodiment, the message is embedded within an instant message (IM), a text, voice mail, digital photo, email, and the like. Further, the message may be conveyed in an easily recognized format, or may be obscured (e.g., requesting the user to identify a previously submitted digital photo, requesting the user to answer a previously submitted query). The next step of this layered authentication process may be providing the message as an input in response to a prompt at the user interface (e.g., at an input-entry area), as indicated at block 650.

If the message corresponds with the expected user input security credentials, then the set of security credentials may be validating, as indicated at block 630. If inconsistent with the expected user input, the invalid message will cause the subscriber server to deny the user access, as indicated at block 635. In a variation of this embodiment, instead of providing the message to the input-entry area of the user interface, the message may be returned to the communications network from the same mobile device, or a second mobile device. If this message and/or communication is authenticated, then a second indication of validity may be sent to the subscriber server as part of the validation process.

Other embodiments of layered security include the following exemplary controls. In one instance, incident to transmitting a communication from a mobile device to the communications network, the communications network provides a query to which the user responds (e.g., stating a password, entering a PIN on the keypad of the mobile device, providing information about the current status of an account with the subscriber server, submitting a token from the mobile device, etc.). In another instance, the communications network utilizes voice recognition to verify the user when stating a response to complete authentication. In yet another instance, if the mobile device is equipped with certain capabilities, biometric data (e.g., retina-scan, DNA, finger-print) is provided within the communication transmitted from the mobile device. In still another instance, the communication may be automatically transmitted from the mobile device if the computing device includes short-range wireless capability to detect whether the phone is in a certain proximity of the computing device. Although a plurality of different embodiments of layered security has been shown, it should be understood and appreciated that other methods could be used, and that other embodiments not shown and described may achieve a similar purpose.

Figure 7:
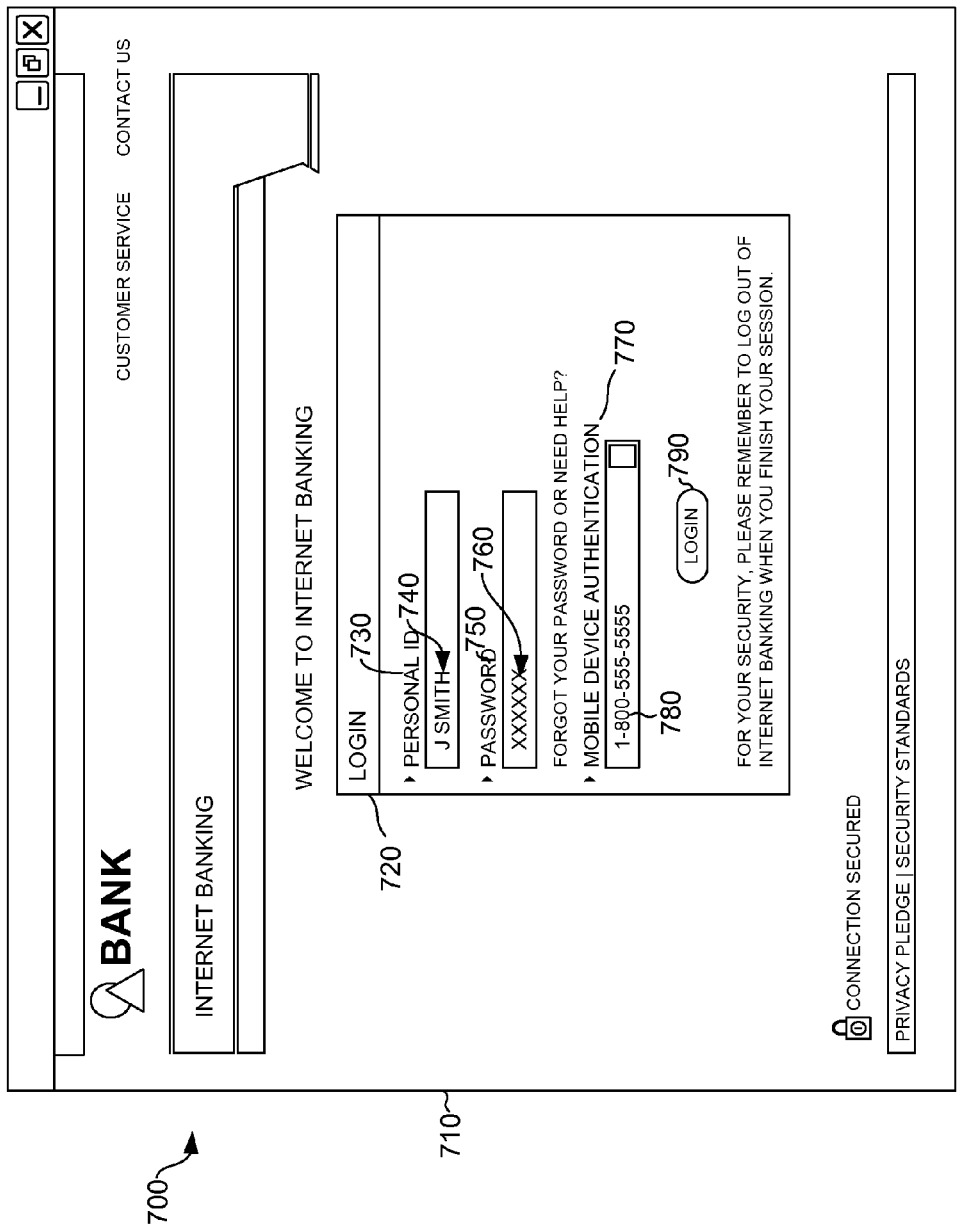
FIG. 7 is an exemplary screen display of an exemplary user interface wherein a user is prompted to input access information for verifying the identity of the user.

With reference to FIG. 7, an exemplary screen display 710 of an exemplary user interface 700 is illustrated, where a user is prompted to input access information for verifying the identity of the user. A login portion 720 is depicted having prompts for the user to input access information. In particular, included is a prompt 730 for the user to input a personal ID in input-entry area 740, and a prompt 750 for the user to input a password in input-entry area 760. Also shown is a prompt 770 to authenticate the mobile device by providing a dial-in number 780. Selectable login area 790 is provided to submit the access information as a request for access.

Figure 8:
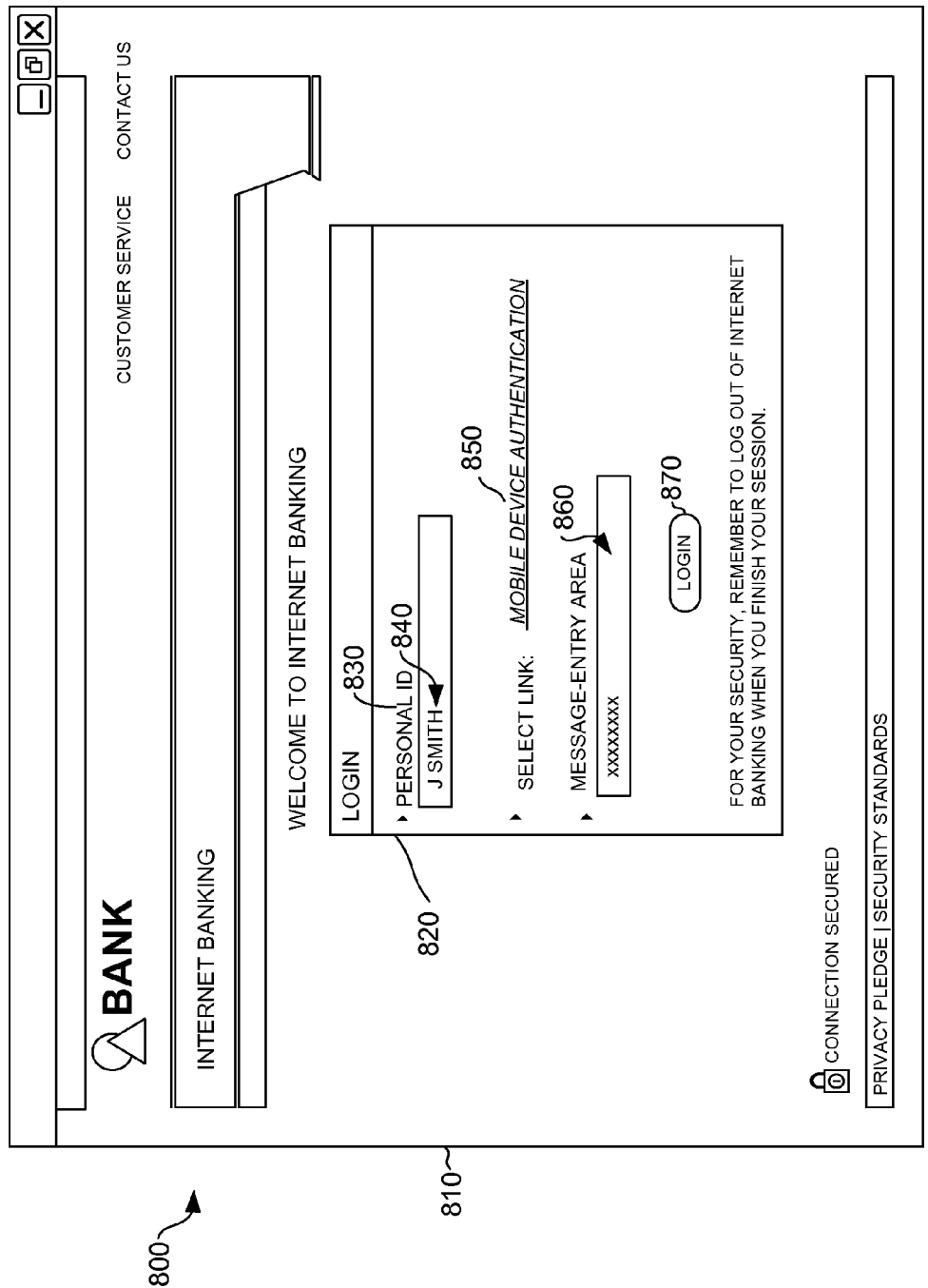
FIG. 8 is an exemplary screen display of an exemplary user interface similar to the screen display of FIG. 7, but with an illustrative link for triggering a communications-network server to send a transmission to the user's mobile device.

Turning now to FIG. 8, an exemplary screen display 810 of an exemplary user interface 800 is illustrated, similar to the screen display 710 of FIG. 7, but with a link 850 for triggering a communications-network server to send a transmission to the user's mobile device. A login portion 820 is depicted having a prompt 830 for the user to input a personal ID in an input-entry area 840. Link 850 is selectable by the user, and incident to selection, may indicate to the communications network that a transmission should be sent to the mobile device registered to the user. The transmission sent to the mobile device may include a message that may be input into message-entry area 860 as a layered measure of security. Selectable login area 870 is provided to submit the access information and message as a request for access. Accordingly, in view of these two exemplary user interfaces 700 and 800, the set of security credentials functions as a robust security measure that allows those users authorized to access the secured portion of the website entry therein, while detected and excluding the unauthorized users.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of verifying a user's identity by leveraging a communications network's network-authentication procedures upon the user attempting to access secure information, the method comprising:
   receiving at the communications network a request from a subscriber that maintains a website, wherein the request is communicated by the subscriber upon the user attempting to access a secured portion of the website, the secured portion of the website potentially providing the user online access to the secure information, wherein the website is configured to accept an input of a personal identifier from the user while attempting to access the secure information, and wherein the subscriber is configured to communicate the personal identifier to the communications network along with the request to verify the user;
   upon receiving the request and recognizing the user via the personal identifier, employing resources at the communication network to validate a set of security credentials associated with the user, wherein validating includes performing a set of network-authentication procedures used by the communications network to verify the user's identity by authenticating the user's mobile device on the communications network, wherein the network-authentication procedures comprise:
      (a) accessing a dial-in number that is pre-established in a profile associated with the subscriber, wherein the dial-in number residing within the profile is assigned to the subscriber for use in verifying the user;
      (b) conveying the dial-in number to the user's mobile device for entry therein; and
      (c) upon entry of the conveyed dial-in number into the mobile device and placement of a call from the mobile device to the dial-in number, receiving the call from the mobile device at the communications network; and
   upon completing the call at the communications network, communicating to the subscriber that the network-authentication procedures are satisfied, thereby granting the user access to the secured portion of the website.

2. The media of claim 1, wherein validating the set of security credentials comprises comparing information within the received request against known authenticated data associated with the user.

3. The media of claim 1, wherein receiving a request comprises receiving data from the user.

4. The media of claim 1, further comprising receiving user information that upon which at least one of the set of user credentials is based, the set of security credentials being stored in a user profile.

5. The media of claim 3, wherein validating the set of security credentials includes comparing the received data against known trustworthy data.

6. The media of claim 1, wherein the method further comprises:
   presenting a user interface on the mobile device or a computing device that prompts the user to provide an input at an input-entry area; and
   receiving at the input-entry area a message input by the user, wherein the message is provided to the user's mobile device by the communications network as part of the network-authentication procedures.

7. The media of claim 6, wherein validating the set of security credentials comprises determining whether the received message satisfies an expected user input.

8. The media of claim 1, wherein the network-authentication procedures further comprises:
   upon entry of the conveyed dial-in number into the mobile device, receiving a call from the mobile device at the communications network;
   upon detecting the call from the mobile device, the communications network determining whether the mobile device is authorized to utilize the communications network, wherein determining comprises:
      (a) recognizing whether the mobile device is authorized to reach a destination associated with the dial-in number; and
      (b) when the mobile device reaches the destination associated with the dial-in number the communications network, creating a success indication that indicates that the mobile device is authorized to utilize the communications network; and
   communicating the success indication to the subscriber.

9. The media of claim 8, wherein the dial-in number is periodically modified.

10. The media of claim 1, wherein satisfaction of the set of network-authentication procedures comprises:
   receiving at a network gateway an indicia of a device identifier carried within the call;
   extracting the device identifier from the call, the device identifier uniquely identifying the mobile device; and authenticating, incident to identifying the mobile device via the device identifier, the mobile device as being associated with the user.

11. The media of claim 1, further comprising:

denying access to the secured portion of the website upon determining that any of the set of security credentials are not satisfied by access information received in the request to access a secured portion of a website; and presenting to the user on a user interface a notice of denial of access to the secured portion of the website.

12. The media of claim 11, further comprising, upon denying access of the secured portion of the website, altering the set of security credentials that are associated with the user.

13. One or more non-transitory computer-readable media having computer-useable instructions embodied thereon for performing a method of providing a user access to digitally secured information by authenticating a mobile device, the method comprising:

receiving a request from a subscriber to verify the user's attempt to access the digitally secured information maintained by the subscriber, the digitally secured information being information that requires validation of a set of security credentials associated with the user to access, wherein the request is generated upon the subscriber detecting the user attempting to access the digitally secured information via a user interface on a computing device;

upon receiving the request at a communications-network server, performing a set of network-authentication procedures at the communications-network server, wherein the network-authentication procedures comprise:

(a) accessing a dial-in phone number pre-established for the subscriber;

(b) conveying the dial-in phone number to the subscriber for presentation to the user via the user interface of the computing device, wherein the presentation on the user interface prompts the user to enter the dial-in phone number into the mobile device;

(c) upon entry of the conveyed phone dial-in number to the mobile device and placement of a call from the mobile device to the dial-in number, receiving the call at the communications-network server, wherein the call carries a device identifier communicated from the mobile device associated with the user; and (d) identifying the mobile device upon extracting the device identifier communicated to the communications-network server and upon matching the device identifier against stored user information; and initiating a communication to the subscriber to grant access to the digitally secured information upon the validation of the device identifier.

14. The media of claim 13, further comprising storing an indicia of the device identifier of the mobile device in association with dial-in phone number, the dial-in phone number provided to the user for initiating the communication of the device identifier.

15. The media of claim 13, further comprising establishing a user profile having the set of security credentials stored therein, the set of user credentials based on user information provided by the user or generated at a subscriber server.

16. The media of claim 13, further comprising denying access to the digitally secured information upon determining that any of the set of security credentials is not satisfied by access information received in the request to access the digitally secured information.

17. One or more non-transitory computer-readable media having computer-useable instructions embodied thereon for performing a method of granting website access to a user, the method comprising:

upon receiving an indication that the user is attempting to access the website, receiving at a communications network a request for authentication from the website maintained by a subscriber, wherein the user is attempting to access the website via a computing device over an Internet connection apart from the communications network, and wherein the request is conveyed from the subscriber;

upon receiving at the communications network the request for authentication from the subscriber, transmitting from the communications network a message to a mobile device associated with the user;

receiving the response at the communications network from the mobile device, wherein the response is automatically generated and conveyed upon the mobile device consuming the message; and incident to authenticating the mobile device on the communications network, providing an indication of validity from the communications network to the subscriber, wherein the indication of validity is employed by the subscriber to grant the user access to the website.

18. The media of claim 17, wherein performing one or more network-authentication procedures includes receiving a communication from a mobile device in response to a call from the mobile device to a certain dial-in number that was conveyed to the user.

19. One or more non-transitory computer-readable media having computer-useable instructions embodied thereon for performing a method of granting website access to a user, the method comprising:

detecting that the user is attempting to access a secured portion of the website maintained by the subscriber, the secured portion of the website representing digitally secure information that requires validation of a set of security credentials associated with the user;

causing a link to be presented on a user interface coupled to a computing device;

recognizing a user-initiated selection of the link via the user interface;

upon recognizing the user-initiated selection, sending a request to a communications network to validate the set of security credentials using a network-authentication procedure;

receiving from the communications network a dial-in phone number that the user is to call using a mobile device associated with the user;

presenting the dial-in phone number to the user at the user interface of the computing device, wherein entering the dial-in phone number to the mobile device starts the network-authentication procedure that determines whether the mobile device is authorized to utilize the communications network, wherein the mobile device is authenticated when the mobile device is allowed to reach a destination associated with the dial-in phone number, and wherein, upon authentication of the mobile device, the communications network creates a success indication that indicates that the mobile device was allowed to reach the destination associated with the dial-in phone number;

receiving the success indication at the subscriber; and incident to receiving the success indication, granting the user access to the secured portion of the website.

\* \* \* \* \*